United States Patent
Baars

(10) Patent No.: US 9,946,749 B2
(45) Date of Patent: Apr. 17, 2018

(54) REWRITING INEQUALITY QUERIES

(71) Applicant: SEMMLE LIMITED, Oxford (GB)

(72) Inventor: Arthur Baars, Oxford (GB)

(73) Assignee: Semmle Limited, Oxford (GB)

(*) Notice: Subject to any disclaimer, the term of this patent is extended or adjusted under 35 U.S.C. 154(b) by 0 days.

(21) Appl. No.: 15/260,136

(22) Filed: Sep. 8, 2016

(65) Prior Publication Data
US 2018/0067988 A1    Mar. 8, 2018

(51) Int. Cl.
G06F 17/30    (2006.01)

(52) U.S. Cl.
CPC .. G06F 17/30448 (2013.01); G06F 17/30454 (2013.01); G06F 17/30477 (2013.01); G06F 17/30554 (2013.01)

(58) Field of Classification Search
CPC ......... G06F 17/30471; G06F 17/30321; G06F 17/30442; G06F 17/30412; G06F 17/30439; G06F 17/30454; G06F 17/30935; G06F 17/30932; G06F 17/30929; G06F 17/3046; G06F 17/30424; G06F 17/30427; G06F 17/30448; Y10S 707/99934; Y10S 707/99932; Y10S 707/99933; Y10S 707/99935; Y10S 707/99931
USPC ... 707/705, 713, 715, 722, 999.002–999.005
See application file for complete search history.

(56) References Cited

U.S. PATENT DOCUMENTS

| | | | |
|---|---|---|---|
| 5,544,355 A | 8/1996 | Chaudhari et al. | |
| 5,963,932 A | 10/1999 | Jakobsson et al. | |
| 7,457,795 B1 | 11/2008 | Sheldon et al. | |
| 2003/0195881 A1 | 10/2003 | Koo et al. | |
| 2004/0030679 A1 | 2/2004 | Gonnet | |
| 2004/0044662 A1* | 3/2004 | Ganesan | G06F 17/30439 |
| 2004/0073549 A1 | 4/2004 | Turkel et al. | |
| 2012/0191697 A1* | 7/2012 | Sherman | G06F 17/30427 707/717 |
| 2014/0379690 A1 | 12/2014 | Ahmed et al. | |
| 2016/0055207 A1* | 2/2016 | Chawda | G06F 17/30498 707/714 |
| 2016/0092702 A1* | 3/2016 | Durham | G06F 21/72 713/190 |

* cited by examiner

*Primary Examiner* — Mark D Featherstone
*Assistant Examiner* — Diedra McQuitery
(74) *Attorney, Agent, or Firm* — Fish & Richardson P.C.

(57) ABSTRACT

Methods, systems, and apparatus, including computer programs encoded on computer storage media, for expressing inequality expressions as a bounded number of equality expressions. One of the methods includes receiving an original query having an inequality expression for an original attribute. A new query that replaces the inequality expression with a bounded number of equality expressions is generated, wherein each equality expression references a respective auxiliary attribute, each auxiliary attribute representing intervals of values for the original attribute. The new query having the bounded number of equality expressions is provided to a database system instead of the original query. Query results that satisfy the inequality expression for the original attribute are received from the database system.

24 Claims, 5 Drawing Sheets

REWRITING INEQUALITY QUERIES

BACKGROUND

This specification relates to query processing in cloud-based distributed systems.

Cloud computing systems can provide database services. In order to provide performance guarantees, some cloud-based systems have significant restrictions on the types of queries that can be submitted as well as restrictions on how the results of a query can be ordered. These restrictions sacrifice consistency for speed, availability, and horizontal scaling.

Three restrictions in such cloud based systems can include: (1) limiting the number of logical expressions in a query, (2) forbidding ordering the query results by attributes of inequality expressions.

For example, cloud-based systems can limit the number of logical expressions in a query to 10, 30, or 100 logical expressions. Any query that has more logical expressions is rejected. In addition, if a query has an inequality expression, e.g., "date>830," the query is similarly rejected. Finally, if a query specifies that the query results should be ordered by an attribute other than an attribute specified in a logical expression, the system may also reject the query.

SUMMARY

This specification describes how a system can transform a query having one or more inequality expressions to an equivalent query having a bounded number of equality expressions.

Particular embodiments of the subject matter described in this specification can be implemented so as to realize one or more of the following advantages. A client system can execute any arbitrary inequality expressions even in cloud-based systems that do not allow ordering query results by attributes named in inequality expressions. The client system can also execute a query that orders results by any field appearing in an inequality expression.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a system can use query rewriting to revise queries having an inequality expression into an equivalent query having a bounded number of equality expressions. A query having an inequality expression, e.g., "x<5," can be referred to as an inequality query.

Figure 1:
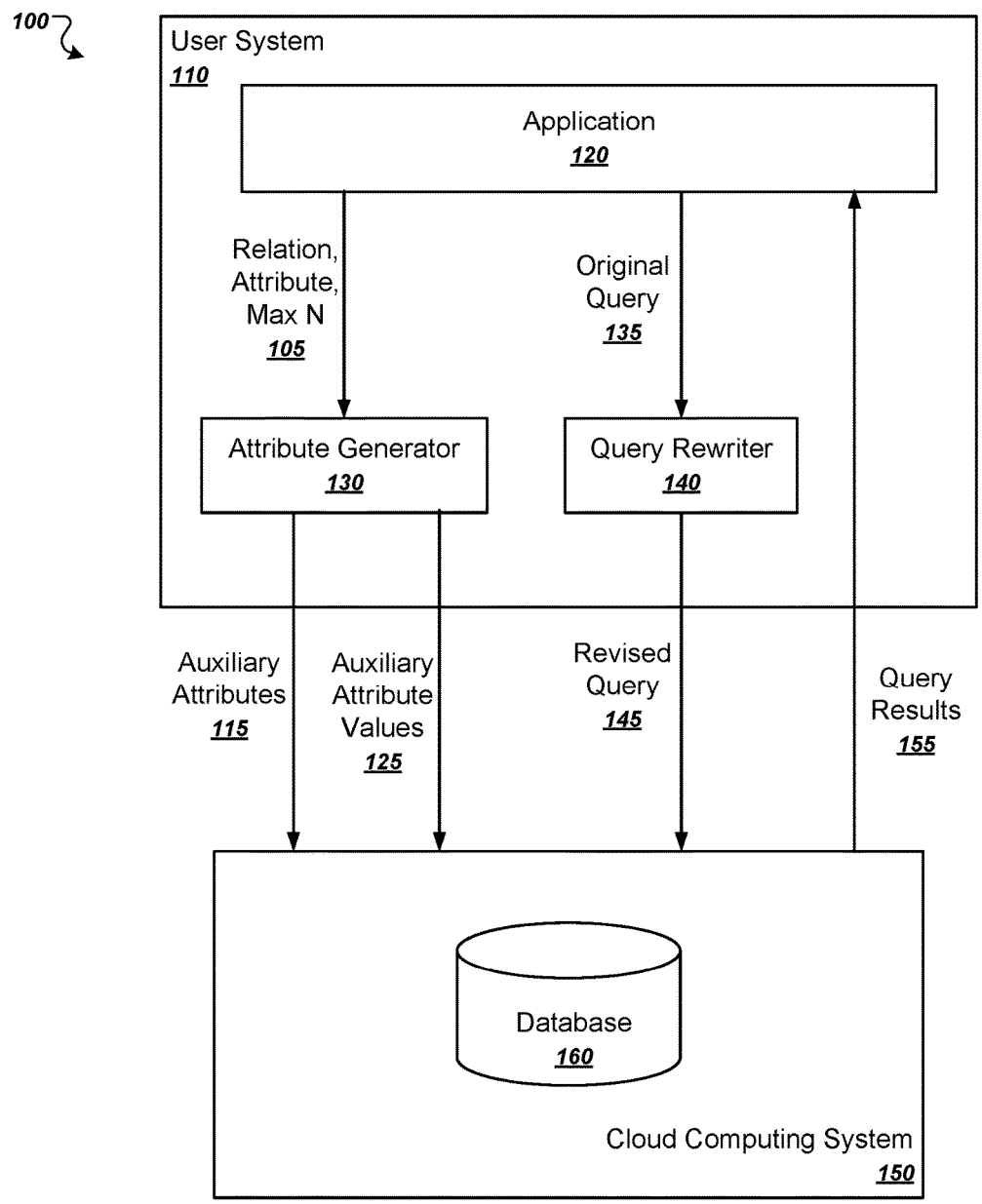
FIG. 1 is a diagram of an example system.

FIG. 1 is a diagram of an example system 100. The system includes a user system 110 in communications with a cloud computing system 150 over a network, which can be any appropriate communications network. The system 100 is an example of a system in which a user system 110 employs an attribute generator 130 and a query rewriter 140 in order to express inequality queries with a bounded number of equality queries.

The cloud computing system 150 includes a database 160. The cloud computing system 150 may impose one or more of the query restrictions mentioned above: limiting the total number of expressions in a query, or limiting how the query results can be ordered.

An application 120 of the user system 110 maintains data in the database 150 in one or more relations. Each relation can be conceptualized as a database table, but the data need not be stored in tabular form. Each relation associates one or more data element with values of one or more attributes for the relation.

In order to support inequality queries, the application 120 can augment the one or more relations in the database 150 with auxiliary attributes. To do so, the application 120 can specify a relation, an attribute of the relation, and a maximum interval size N 105 to an attribute generator 130.

The attribute generator 130 receives the relation, attribute, and maximum interval size N 105 and directs the cloud computing system 120 to generate, in the specified relation, auxiliary attributes 115. Each auxiliary attribute can represent an interval of values for the original attribute. Each of the auxiliary attributes has a different associated interval size up to and including the maximum interval size N. In some implementations, the auxiliary attributes have an exponential relationship, e.g., they are sequential exponential powers of a particular base. For example, the system can use the exponent base 2 and generate auxiliary attributes corresponding to interval sizes of $2^1$, $2^2$, $2^3$, $2^4$, etc., until generating an auxiliary attribute that is greater than the maximum interval size N.

Then, for each of the auxiliary attributes 115, the attribute generator 130 can process the data elements in the database 150 to generate corresponding values 125 for each of the auxiliary attributes 115. Each auxiliary attribute value 125 references a particular interval for the particular auxiliary attribute.

After generating the auxiliary attributes 115 and corresponding auxiliary attribute values 125, the application 120 can use them to query the database 150 with inequality queries, even if such queries are forbidden by the cloud computing system 120.

To do so, the application 120 can provide an original query 135 to a query rewriter 140. The query rewriter 140 generates a revised query 145 that removes the inequality expression from the original query 135 and replaces it with a disjunct of equality expressions.

The cloud computing system receives the revised query 145 having the disjunct of equality expressions. Because the revised query 145 has no inequalities and because the revised query 145 has a bounded number of equality expressions, the revised query 145 does not violate any rules of the cloud computing system 120.

Thus, the cloud computing system 120 responds to the revised query 145 with query results 155, which the cloud computing system forwards back to the user system 110 for use by the application 120.

Figure 2:
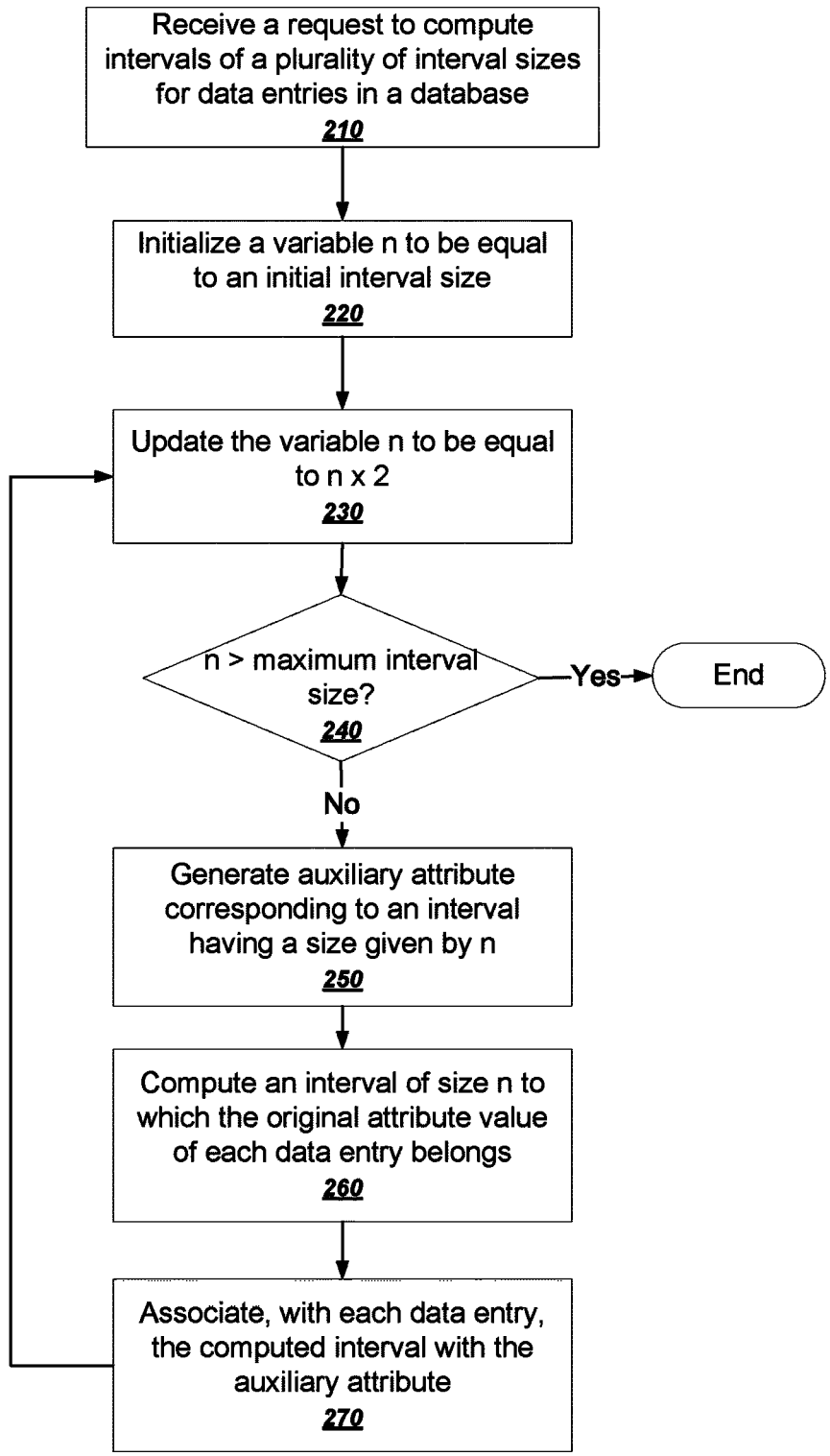
FIG. 2 is a flow chart of an example process for associating data entries with auxiliary attributes.

FIG. 2 is a flow chart of an example process for associating data entries with auxiliary attributes. The process will be described as being performed by a system of one or more computers, e.g. the attribute generator 130 of FIG. 1.

The system receives a request to compute intervals of a plurality of interval sizes for data entries in a database (210). The system can receive parameters for associating interval values for a plurality of interval sizes, including an original attribute and a maximum interval size.

The system initializes a variable n to be equal to an initial interval size (220). The system can use a default initial interval size, e.g., 1, 2, or 4, or the initial interval size can be specified as an optional parameter. Specifying the initial interval size as a parameter may be required for some data types, e.g., for floating point attribute values.

The system updates the variable n to be equal to n×2 (230).

The system determines whether n is greater than the maximum interval size (240). If so, the process ends (branch to end).

If not, the system generates an auxiliary attribute corresponding to an interval having a size given by the variable n (250). To do so, the system can update each of the data entries to have a new auxiliary attribute corresponding to intervals of the size given by n. For example, if the data entries are stored in a database table, the system can generate a new column in the database table for the interval size. As an example, if the initial interval size was 1, the new auxiliary attribute can correspond to intervals of size 2.

The system computes an interval of size n to which the original attribute value of each data entry belongs (260). In other words, the system determines, for each original attribute value of the given original attribute, to which interval, of intervals having size, the original attribute value belongs.

For example, if the original attribute value was 894 and the auxiliary attribute corresponds to intervals of size 2, the system can compute that the value 894 belongs to interval 447 for intervals having size 2. In other words, the 447th interval of size 2 includes both 894 and 895. Therefore, the auxiliary attribute value is 447 for the original attribute value 894.

The system associates, with each data entry, the computed interval with the auxiliary attribute (270). For example, the system can update a newly created column corresponding to the auxiliary attribute using the computed interval for each data entry.

The system then once again updates the variable n to be equal to n×2 (branch to 230).

Figure 3:
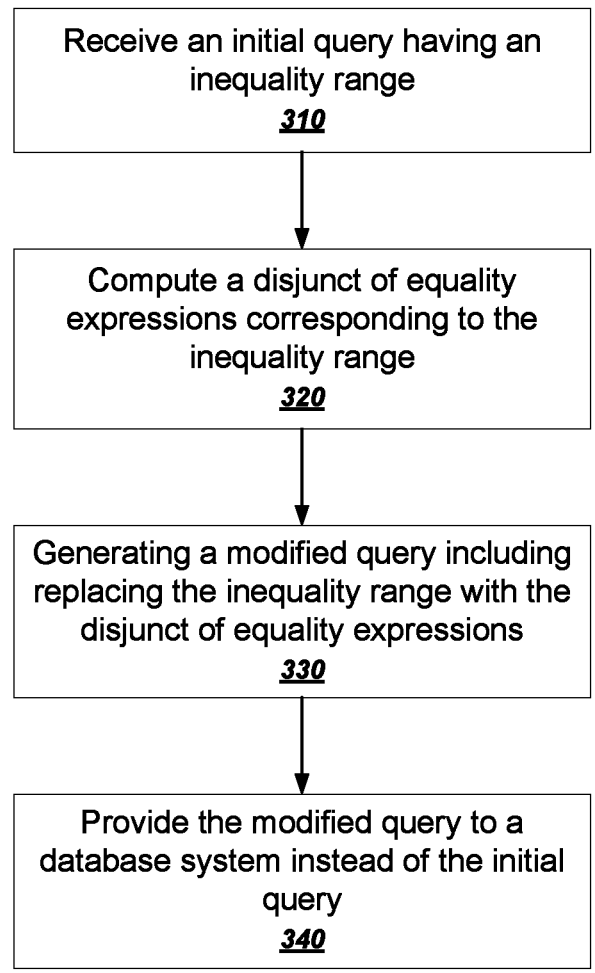
FIG. 3 is a flow chart of an example process for rewriting an inequality query.

FIG. 3 is a flow chart of an example process for rewriting an inequality query. The process will be described as being performed by a system of one or more computers, e.g. the query rewriter 140 of FIG. 1.

The system receives an initial query having an inequality range (310). For example, a query rewriter of a user system can receive a query intended for a cloud-based database service.

The inequality range in the query can be any appropriate logical query expression that requests data entries having attribute values that satisfy an inequality expression. The inequality expression can specify a single end point, e.g., "x<500" or multiple end points, e.g., "x>100 and x<500". If a single end point is specified by the inequality expression, the system can use a default end point, e.g., 0.

The system computes a disjunct of equality expressions corresponding to the inequality range (320). The system can generate a bounded number of equality expressions for any given inequality range and combine them into a single disjunct. In general, a disjunct is a plurality of logical expressions joined together by logical OR. This process is described in more detail below with reference to FIG. 4.

The system generates a modified query including replacing the inequality range with the disjunct of equality expressions (330). For example, the system can perform a text substitution that replaces the inequality range in the query with the disjunct of equality expressions.

The system provides the modified query to a database system instead of the initial query (340). After providing the modified query, the database system will generate query results that satisfy the initial query. This may be so even when the database system does not allow ordering the query results by attributes occurring in inequality expressions or if the system limits the number of logical expressions in a query.

Figure 4:
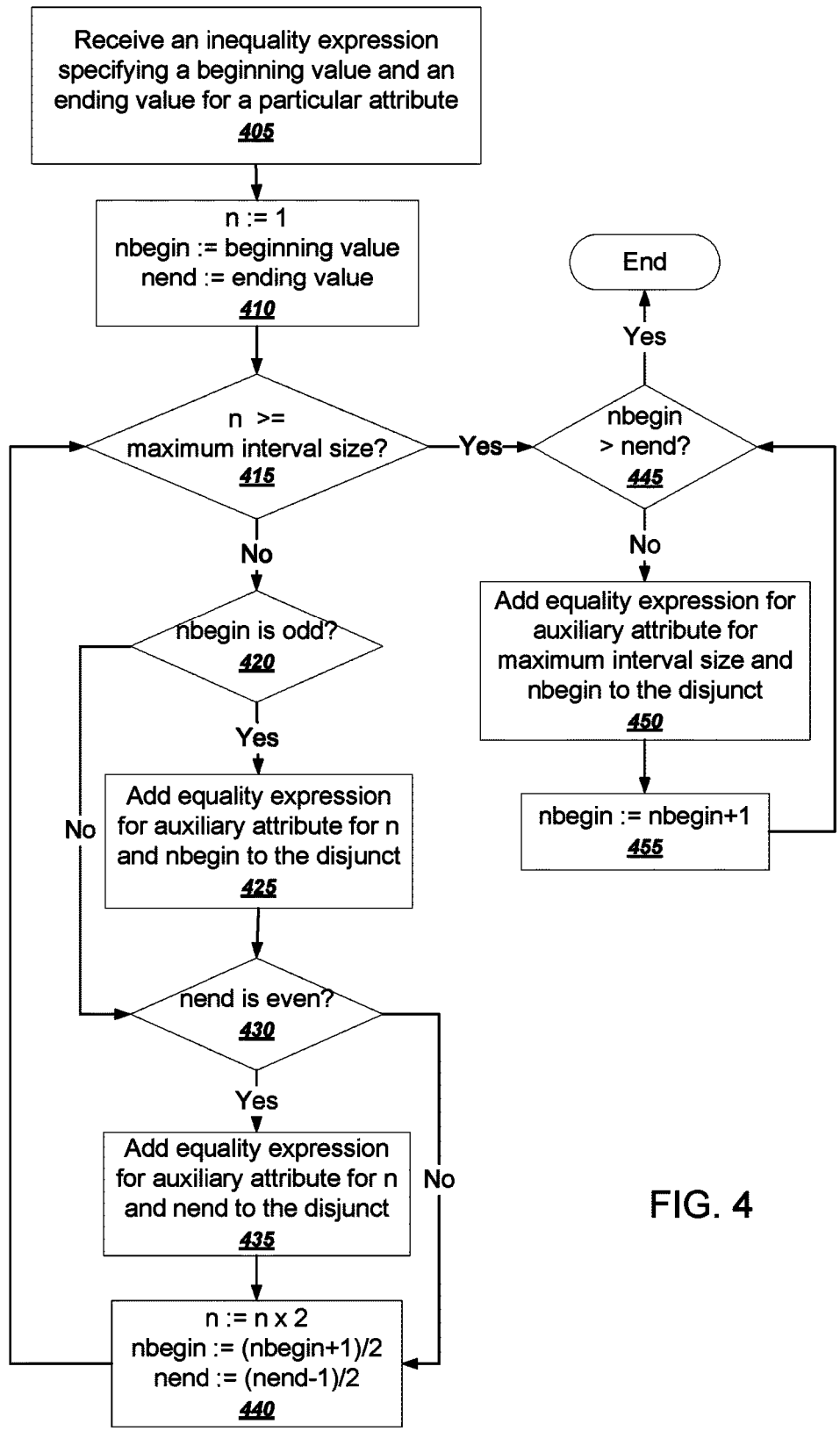
FIG. 4 is a flow chart of an example process for generating a disjunct of equality expressions for a given inequality expression.

FIG. 4 is a flow chart of an example process for generating a disjunct of equality expressions for a given inequality expression. The process will be described as being performed by a system of one or more computers, e.g. the query rewriter 140 of FIG. 1.

The system receives an inequality expression specifying a beginning value and an ending value for a particular attribute (405). As described above, the beginning value or the ending value may be implicit, e.g., 0 or a minimum or a maximum value, for a particular inequality expression.

The inequality expression will also reference, explicitly or implicitly, an original attribute. For example, the inequality expression can include an attribute name for the attribute or identify a table column corresponding to the attribute.

The system sets a variable n to be equal to 1, a variable nbegin to be equal to the beginning value, and a variable nend to be equal to the ending value (410). During the example process, a system will update these values as it continues to generate equality expressions.

The system determines whether n is greater than a maximum interval size (415).

If n is not greater than or equal to the maximum interval size, the system determines whether or not nbegin is odd (branch to 420).

If nbegin is odd, the system adds an equality expression for an auxiliary attribute for n and nbegin to the disjunct of equality expressions (branch to 425). This means that the system adds, in the appropriate query language, a term to the disjunct that tests for equality of the auxiliary attribute corresponding to n with the value of nbegin. For example, if the auxiliary attribute name for n=2 is "x2" and the value of nbegin is 37, the system can generate the equality expression "x2=37" that specifies identifying records whose auxiliary attribute "x2" has a value of 37.

If nbegin is not odd (420), the system bypasses step 425 (branch to 430).

The system determines whether nend is even (430).

If nend is even, the system adds an equality expression for an auxiliary attribute for n and nend to the disjunct of equality expressions (branch to 435). This means that the system adds, in the appropriate query language, a term to the disjunct that tests for equality of the auxiliary attribute corresponding to n with the value of nend, e.g., "x4=15" if the auxiliary attribute name for n=4 is "x4" and the value of nend is 15.

If nend is not even (430), the system bypasses step 435 (branch to 440).

The system updates n to be n×2, nbegin to be (nbegin+1)/2, and nend to be (nend−1)/2 (440). The system then again determines whether or not n is greater than or equal to the maximum interval size (415).

If so, the system will transition to enumerating equality expressions for auxiliary attributes corresponding to the maximum interval size between nbegin and nend.

If n is greater than or equal to the maximum interval size, the system determines whether nbegin is greater than nend (445).

If not, the system adds an equality expression for an auxiliary attribute for the maximum interval size and nbegin to the disjunct (branch to 450). In other words, the system adds, in the appropriate query language, a term to the disjunct that tests for quality of an auxiliary attribute for the maximum interval size with the value of nbegin, e.g., "x128=5" if the auxiliary attribute name for the maximum interval size is "x128" and the value of nbegin is 5.

The system increments the value of nbegin (455) and again determines whether or not nbegin is greater than nend (450). If so, the process ends (branch to end)

Figure 5:
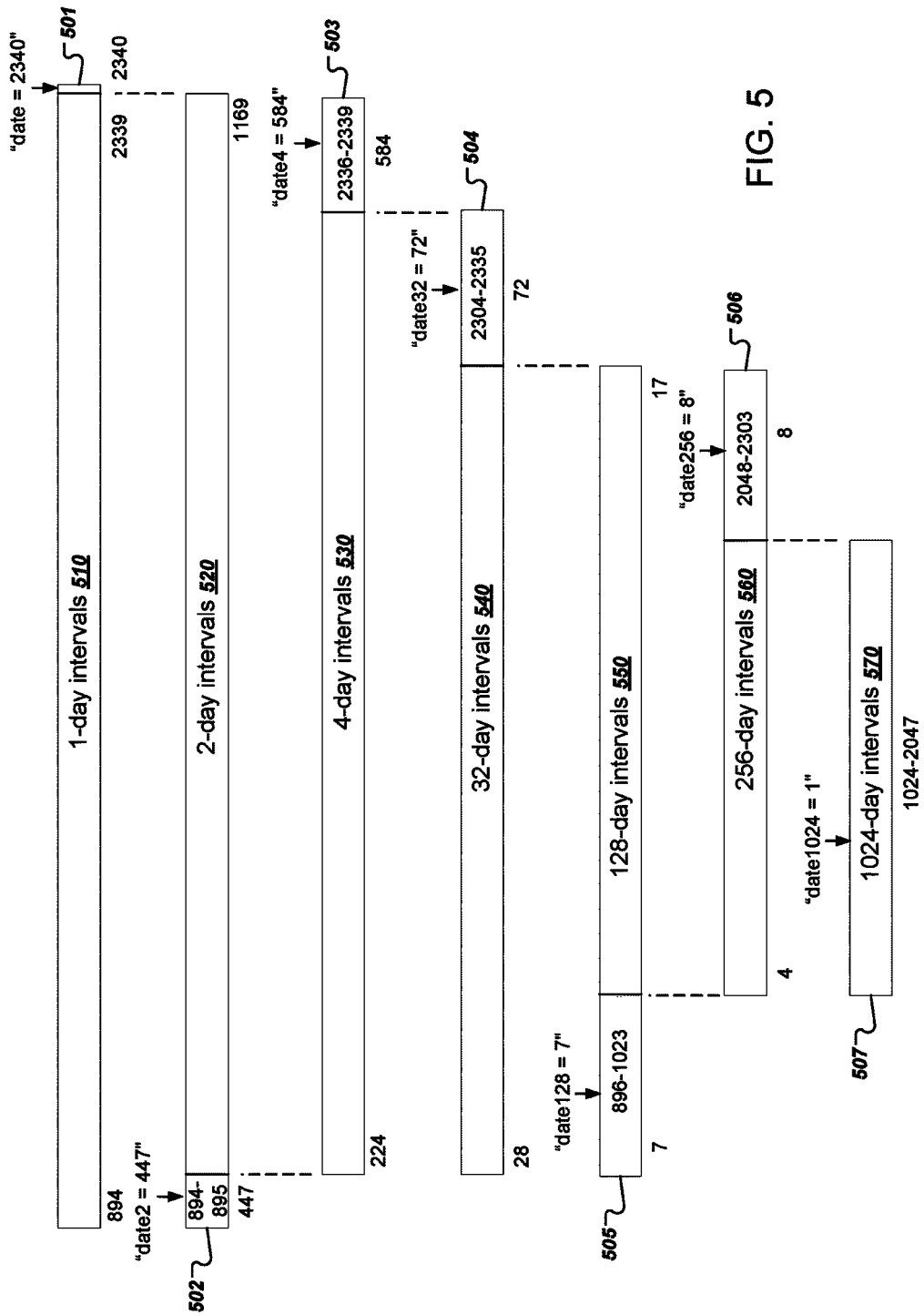
FIG. 5 is a diagram that illustrates generating equality expressions using auxiliary attributes.

FIG. 5 is a diagram that illustrates generating equality expressions using auxiliary attributes. FIG. 5 illustrates the equality expressions that would be generated for a query having a range expressed as an inequality. In this example, the inequality is "date>=894 AND date<=2340." A system can perform the example process described above in reference to FIG. 4 to process this inequality expression in order to generate the equality expressions described below.

In this example, each value of the original attribute, named "date," represented a distinct day of the year. The auxiliary attributes, on the other hand, each represent intervals of multiple days. FIG. 5 conceptually illustrates the intervals that are referenced by the auxiliary attributes in the generated equality expressions.

The original "date" attribute includes values for different 1-day intervals 510. The first equality expression that is generated is "date=2340." In other words, this equality expression references the last 1-day interval 501 that satisfies dates within the original inequality expression.

The auxiliary attribute named "date2" represents 2-day intervals 520. The first 2-day interval 502 represents days 894-895 and is thus the first of the 2-day intervals representing dates that all satisfy the original inequality expression. Therefore, the system generates the equality expression "date2=447" to refer to that 2-day interval.

The auxiliary attribute named "date4" represents 4-day intervals 530. The last 4-day interval 503 represents days 2336-2339 and is thus the last of the 4-day intervals representing days that all satisfy the original inequality expression. In some implementations, the system generates the equality expressions so that there is no overlap between the values represented by the equality expressions. Thus, the system generates the equality expression "date4=584." This equality expression references the last 4-day interval 503, representing days 2336-2339, which does not overlap the last 1-day interval 501 representing day 2440.

The auxiliary attribute named "date32" represents 32-day intervals 540. The last 32-day interval 504 represents days 2304-2335 and is thus the last of the 32-day intervals representing days that all satisfy the original inequality expression. Although the system may have generated auxiliary dates for 8-day and 16-day intervals, in this example the system need not generate any equality expressions for those auxiliary attributes. In other words, when generating a disjunct of equality expressions, the system need not use all auxiliary attributes. Furthermore, in this example only a single equality expression is generated for each auxiliary attribute that is used. However, the system may generate multiple equality expressions for each auxiliary attribute that is used. Thus, the system generates the equality expression "date32=72" to reference days 2304-2335.

The auxiliary attribute for 64-day intervals is not used.

The auxiliary attribute named "date128" represents 128-day intervals 550. The first 128-day interval 505 represents days 896-1023 and is thus the first of the 128-day intervals representing days that all satisfy the original inequality expression. Thus, the system generates the equality expression "date128=7" to reference days 896-1023.

The auxiliary attribute named "date256" represents 256-day intervals 560. The last 256-day interval 506 represents days 2048-2303 and is thus the last of the 256-day intervals representing days that all satisfy the original inequality expression. Thus, the system generates the equality expression "date256=8" to reference days 2048-2303.

The auxiliary attribute for 512-day intervals is not used.

The auxiliary attribute named "date1024" represents 1024-day intervals 570. The first and last 1024-day interval 507 represents days 1024-2047 and is the only 1024-day interval that represents days that all satisfy the original inequality expression. Thus, the system generates the equality expression "date1024=1" to reference days 1024-2047.

The system can then replace the original inequality expression "date>=894 AND date<=2340" with a new disjunct of the generated equality expressions. Thus, the system can rewrite the query to have the following disjunct of seven equality expressions: "date1=2440 OR date2=447 OR date4=584 OR date32=72 OR date128=7 OR date256=8 OR date1024=1". While the original date range specified 1447 days, the system is able to represent all of these days with only 7 equality expressions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments described above, the following embodiments are also innovative:

Embodiment 1 is a method comprising:
  receiving, by a query rewriter of a user device in communication with a database system, an original query having an inequality expression for an original attribute,
  generating a new query that replaces the inequality expression with a bounded number of equality expressions, wherein each equality expression references a respective auxiliary attribute, each auxiliary attribute representing intervals of values for the original attribute;
  providing, by the user device to the database system, the new query having the bounded number of equality expressions instead of the original query; and receiving, by the user device from the database system, query results that satisfy the inequality expression for the original attribute.

Embodiment 2 is the method of embodiment 1, further comprising:
generating, for a plurality of data entries having respective original attribute values for the original attribute, a plurality of interval sizes up to and including a maximum interval size;
computing, for each data entry and for each interval size of the plurality of interval sizes, a respective interval number for the interval size to which the original attribute value for the data entry belongs; and
storing the computed interval numbers for each data entry in a database system in association with the data entry;

Embodiment 3 is the method of any one of embodiments 1-2, wherein generating the new query that replaces the inequality expression with a bounded number of equality expressions comprises:
generating a disjunct of equality expressions including determining, for each interval size of a plurality of interval sizes other than a maximum interval size, whether respective equality expressions that test for an auxiliary attribute value belonging to the first interval at the interval size, the last interval at the interval size, or both, should be added to the disjunct of equality expressions.

Embodiment 4 is the method of any one of embodiments 1-3, wherein the inequality expression specifies a range of values, and wherein the bounded number of equality expressions collectively represent intervals that cover all values in the range with no overlap.

Embodiment 5 is the method of any one of embodiments 1-4, further comprising
generating respective auxiliary attributes in the database corresponding to each of a plurality of interval sizes; and
generating respective auxiliary attribute values for each data entry and auxiliary attribute in the database.

Embodiment 6 is the method of embodiment 5, wherein the plurality of interval sizes correspond to sequential powers of a particular exponent base.

Embodiment 7 is the method of any one of embodiments 1-6, wherein the database system limits a number of disjunct expressions that can occur in a query.

Embodiment 8 is the method of any one of embodiments 1-7, wherein the database system forbids ordering query results by attributes used in inequality expressions.

Embodiment 9 is the method of any one of embodiments 1-8, wherein the query specifies an ordering of the query results by an attribute in the inequality expression, and wherein the database system disallows ordering query results by attributes occurring in inequality expressions.

Embodiment 10 is method of any one of embodiments 1-9, further comprising generating the bounded number of equality expressions including:
initializing a variable n to be equal to 1, initializing a variable nbegin to be equal to the start of a range of values specified by the inequality expression, and initializing a variable nend to be equal to the end of the range of values specified by the inequality expression;
iteratively performing the following operations until the variable n is greater than or equal to a maximum interval size:
determining whether nbegin is odd and adding an equality expression testing for an auxiliary attribute having a value belonging to a first interval of size n whenever nbegin is odd;
determining whether nend is even and adding an equality expression testing for an auxiliary attribute having a value belonging to a last interval of size n whenever nend is odd;
setting the variable n to be equal to n×2;
setting nbegin to be equal to (nbegin+1)/2 and discarding any remainder;
setting nend to be equal to (nend−1)/2 and discarding any remainder.

Embodiment 11 is the method of embodiment 10, further comprising performing the following operations until nbegin is greater than nend:
adding an equality expression testing for the auxiliary attribute belonging to the interval identified by nbegin; and
setting nbegin to be equal to nbegin+1.

Embodiment 12 is a system comprising: one or more computers and one or more storage devices storing instructions that are operable, when executed by the one or more computers, to cause the one or more computers to perform the method of any one of embodiments 1 to 11.

Embodiment 13 is a computer storage medium encoded with a computer program, the program comprising instructions that are operable, when executed by data processing apparatus, to cause the data processing apparatus to perform the method of any one of embodiments 1 to 11.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
generating, for an original attribute of a relation maintained in a database system, a respective auxiliary attribute for each interval size of a plurality of interval sizes, each interval size corresponding to a different respective power of a particular exponent base;
computing, for each data entry of the relation and for each interval size of the plurality of interval sizes, a respective interval number for the interval size to which an original attribute value of the data entry belongs;
storing each respective computed interval number for each data entry in the database system as an auxiliary attribute value of a corresponding auxiliary attribute for the data entry;
receiving, by a query rewriter of a user device in communication with the database system, an original query having an inequality expression for the original attribute;
generating a new query that replaces the inequality expression with multiple equality expressions, wherein each equality expression references a different respective auxiliary attribute, each auxiliary attribute representing a different respective interval size for values of the original attribute;
providing, by the user device to the database system, the new query having the multiple equality expressions instead of the original query; and
receiving, by the user device from the database system, query results that satisfy the inequality expression for the original attribute.

2. The method of claim 1, wherein generating the new query that replaces the inequality expression with a bounded number of equality expressions comprises:
generating a disjunct of equality expressions including determining, for each interval size of a plurality of interval sizes other than a maximum interval size, whether respective equality expressions that test for an auxiliary attribute value belonging to a first interval at the interval size, a last interval at the interval size, or both, should be added to the disjunct of equality expressions.

3. The method of claim 1, wherein the inequality expression specifies a range of values, and wherein the multiple equality expressions are a bounded number of equality expressions that collectively represent intervals that cover all values in the range of values with no overlap.

4. The method of claim 1, wherein the plurality of interval sizes correspond to sequential powers of two.

5. The method of claim 1, wherein the database system limits a number of disjunct expressions that can occur in a query.

6. The method of claim 1, wherein the database system forbids ordering query results by one or more attributes used in inequality expressions.

7. The method of claim 1, wherein the original query specifies an ordering of the query results by an attribute in the inequality expression, and wherein the database system restricts ordering query results occurring in inequality expressions.

8. The method of claim 1, further comprising generating the multiple equality expressions including:
initializing a variable n to be equal to 1, initializing a variable nbegin to be equal to a start of a range of values specified by the inequality expression, and initializing a variable nend to be equal to an end of the range of values specified by the inequality expression; and
iteratively performing the following operations until the variable n is greater than or equal to a maximum interval size:
determining whether nbegin is odd and adding an equality expression testing for an auxiliary attribute having a value belonging to a first interval of size n whenever nbegin is odd;
determining whether nend is even and adding an equality expression testing for an auxiliary attribute having a value belonging to a last interval of size n whenever nend is odd;
setting the variable n to be equal to n×2;
setting nbegin to be equal to (nbegin+1)/2 and discarding any remainder; and
setting nend to be equal to (nend−1)/2 and discarding any remainder.

9. The method of claim 8, further comprising performing the following operations until nbegin is greater than nend:
adding an equality expression testing for the auxiliary attribute belonging to an interval identified by nbegin; and
setting nbegin to be equal to nbegin+1.

10. A system comprising:
one or more computers comprising one or more processors and one or more storage devices storing instructions that are operable, when executed by the one or more computers, to cause the one or more computers to perform operations comprising:
generating, for an original attribute of a relation maintained in a database system, a respective auxiliary attribute for each interval size of a plurality of interval sizes, each interval size corresponding to a different respective power of a particular exponent base;
computing, for each data entry of the relation and for each interval size of the plurality of interval sizes, a respective interval number for the interval size to which an original attribute value of the data entry belongs;
storing each respective computed interval number for each data entry in the database system as an auxiliary attribute value of a corresponding auxiliary attribute for the data entry;
receiving, by a query rewriter of a user device in communication with the database system, an original query having an inequality expression for the original attribute;
generating a new query that replaces the inequality expression with multiple equality expressions, wherein each equality expression references a different respective auxiliary attribute, each auxiliary attribute representing a different respective interval size for values of the original attribute;
providing, by the user device to the database system, the new query having the multiple equality expressions instead of the original query; and
receiving, by the user device from the database system, query results that satisfy the inequality expression for the original attribute.

11. The system of claim 10, wherein generating the new query that replaces the inequality expression with a bounded number of equality expressions comprises:
generating a disjunct of equality expressions including determining, for each interval size of a plurality of interval sizes other than a maximum interval size, whether respective equality expressions that test for an auxiliary attribute value belonging to a first interval at the interval size, a last interval at the interval size, or both, should be added to the disjunct of equality expressions.

12. The system of claim 10, wherein the inequality expression specifies a range of values, and wherein the multiple equality expressions are a bounded number of equality expressions that collectively represent intervals that cover all values in the range of values with no overlap.

13. The system of claim 10, wherein the plurality of interval sizes correspond to sequential powers of two.

14. The system of claim 10, wherein the database system limits a number of disjunct expressions that can occur in a query.

15. The system of claim 10, wherein the database system forbids ordering query results by one or more attributes used in inequality expressions.

16. The system of claim 10, wherein the original query specifies an ordering of the query results by an attribute in the inequality expression, and wherein the database system restricts ordering query results occurring in inequality expressions.

17. The system of claim 10, wherein the operations further comprise generating the multiple equality expressions including:
  initializing a variable n to be equal to 1, initializing a variable nbegin to be equal to a start of a range of values specified by the inequality expression, and initializing a variable nend to be equal to an end of the range of values specified by the inequality expression; and
  iteratively performing the following operations until the variable n is greater than or equal to a maximum interval size:
    determining whether nbegin is odd and adding an equality expression testing for an auxiliary attribute having a value belonging to a first interval of size n whenever nbegin is odd;
    determining whether nend is even and adding an equality expression testing for an auxiliary attribute having a value belonging to a last interval of size n whenever nend is odd;
    setting the variable n to be equal to n×2;
    setting nbegin to be equal to (nbegin+1)/2 and discarding any remainder; and
    setting nend to be equal to (nend−1)/2 and discarding any remainder.

18. The system of claim 17, wherein the operations further comprise performing the following operations until nbegin is greater than nend:
  adding an equality expression testing for the auxiliary attribute belonging to an interval identified by nbegin; and
  setting nbegin to be equal to nbegin+1.

19. A computer program product, encoded on one or more non-transitory computer storage media, comprising instructions that when executed by one or more computers cause the one or more computers to perform operations comprising:
  generating, for an original attribute of a relation maintained in a database system, a respective auxiliary attribute for each interval size of a plurality of interval sizes, each interval size corresponding to a different respective power of a particular exponent base;
  computing, for each data entry of the relation and for each interval size of the plurality of interval sizes, a respective interval number for the interval size to which an original attribute value of the data entry belongs;
  storing each respective computed interval number for each data entry in the database system as an auxiliary attribute value of a corresponding auxiliary attribute for the data entry,
  receiving, by a query rewriter of a user device in communication with the database system, an original query having an inequality expression for the original attribute,
  generating a new query that replaces the inequality expression with multiple equality expressions, wherein each equality expression references a different respective auxiliary attribute, each auxiliary attribute representing a different respective interval size for values of the original attribute;
  providing, by the user device to the database system, the new query having the multiple equality expressions instead of the original query; and
  receiving, by the user device from the database system, query results that satisfy the inequality expression for the original attribute.

20. The computer program product of claim 19, wherein generating the new query that replaces the inequality expression with a bounded number of equality expressions comprises:
  generating a disjunct of equality expressions including determining, for each interval size of a plurality of interval sizes other than a maximum interval size, whether respective equality expressions that test for an auxiliary attribute value belonging to a first interval at the interval size, a last interval at the interval size, or both, should be added to the disjunct of equality expressions.

21. The computer program product of claim 19, wherein the inequality expression specifies a range of values, and wherein the multiple equality expressions are a bounded number of equality expressions that collectively represent intervals that cover all values in the range of values with no overlap.

22. The computer program product of claim 19, wherein the plurality of interval sizes correspond to sequential powers of two.

23. The computer program product of claim 19, wherein the operations further comprise generating the multiple equality expressions including:
  initializing a variable n to be equal to 1, initializing a variable nbegin to be equal to a start of a range of values specified by the inequality expression, and initializing a variable nend to be equal to an end of the range of values specified by the inequality expression; and
  iteratively performing the following operations until the variable n is greater than or equal to a maximum interval size:
    determining whether nbegin is odd and adding an equality expression testing for an auxiliary attribute having a value belonging to a first interval of size n whenever nbegin is odd;
    determining whether nend is even and adding an equality expression testing for an auxiliary attribute having a value belonging to a last interval of size n whenever nend is odd;
    setting the variable n to be equal to n×2;
    setting nbegin to be equal to (nbegin+1)/2 and discarding any remainder; and setting nend to be equal to (nend−1)/2 and discarding any remainder.

24. The computer program product of claim 23, wherein the operations further comprise performing the following operations until nbegin is greater than nend:
adding an equality expression testing for the auxiliary attribute belonging to an interval identified by nbegin; and
setting nbegin to be equal to nbegin+1.

* * * * *

UNITED STATES PATENT AND TRADEMARK OFFICE
CERTIFICATE OF CORRECTION

PATENT NO.       : 9,946,749 B2
APPLICATION NO.  : 15/260136
DATED            : April 17, 2018
INVENTOR(S)      : Arthur Baars It is certified that error appears in the above-identified patent and that said Letters Patent is hereby corrected as shown below:

In the Claims

Column 14, Line 6: In Claim 19, delete "entry," and insert -- entry; --, therefor.

Signed and Sealed this
Twenty-ninth Day of May, 2018

Andrei Iancu
*Director of the United States Patent and Trademark Office*